(12) United States Patent
Trinier

(10) Patent No.: US 10,611,219 B2
(45) Date of Patent: Apr. 7, 2020

(54) CARGO-BED COVER SYSTEM AND METHOD

(71) Applicant: Brent Wesley Trinier, Calgary (CA)

(72) Inventor: Brent Wesley Trinier, Calgary (CA)

(*) Notice: Subject to any disclaimer, the term of this patent is extended or adjusted under 35 U.S.C. 154(b) by 0 days.

(21) Appl. No.: 15/689,935

(22) Filed: Aug. 29, 2017

(65) Prior Publication Data

US 2019/0061497 A1 Feb. 28, 2019

(51) Int. Cl.
*B60J 7/16* (2006.01)
*B60J 7/19* (2006.01)

(52) U.S. Cl.
CPC ............. *B60J 7/1614* (2013.01); *B60J 7/198* (2013.01)

(58) Field of Classification Search
CPC . B60J 7/1614; B60J 7/198; B60P 3/34; B60P 3/39
USPC ............ 296/100.03, 100.05, 26.05, 165, 175
See application file for complete search history.

(56) References Cited

U.S. PATENT DOCUMENTS

| | | | | |
|---|---|---|---|---|
| 4,201,413 A * | 5/1980 | Rowe | ........................ | B60P 3/34 296/165 |
| 4,603,901 A * | 8/1986 | McIntosh | .................. | B60P 3/34 296/165 |
| 4,673,209 A | 6/1987 | Hassan | | |
| 5,002,329 A * | 3/1991 | Rafi-Zadeh | ............ | B60J 7/1614 248/166 |
| 5,203,364 A * | 4/1993 | Koole | ........................ | B60P 3/42 135/148 |
| 5,364,154 A | 11/1994 | Kaiser | | |
| 5,735,565 A * | 4/1998 | Papai | ........................ | B60P 3/34 296/165 |
| 6,209,944 B1 * | 4/2001 | Billiu | ...................... | B60J 7/1614 296/100.02 |
| 6,712,422 B1 | 3/2004 | Vaillancourt | | |
| 7,226,108 B2 * | 6/2007 | Altman | .................. | B60J 7/1614 296/100.02 |
| 7,654,603 B2 | 2/2010 | Kealy | | |
| 7,959,200 B2 * | 6/2011 | Voglmayr | ................. | B60P 3/40 296/100.05 |
| 9,849,763 B1 * | 12/2017 | Sullivan | .................... | B60J 7/085 |
| 2006/0017303 A1 * | 1/2006 | Weege | ...................... | B60J 7/062 296/105 |
| 2008/0174142 A1 | 7/2008 | Pearlman | | |
| 2009/0146450 A1 | 6/2009 | Flores | | |

(Continued)

FOREIGN PATENT DOCUMENTS

CA 2427711 11/2004

*Primary Examiner* — Gregory A Blankenship
(74) *Attorney, Agent, or Firm* — Charles E. Runyan

(57) ABSTRACT

A cargo-bed cover system and method as used to improve the covering of cargo beds of pickup trucks by providing an apparatus having the functionality of both a truck topper and a hard top tonneau cover. The cargo-bed cover system includes a rigid cover configured to cover the cargo bed of the pickup truck; coupled to the rigid cover, a mechanically-powered lifting assembly configured to vertically lift the rigid cover between a bed-covering position, located adjacent the cargo bed, and at least one raised position located above the cargo bed; a mounting assembly configured to removably mount the mechanically-powered lifting assembly to the cargo bed; and enclosing panels adapted to enclose an area formed between the rigid cover and the cargo bed when the rigid cover is in the at least one raised position.

17 Claims, 10 Drawing Sheets

(56) References Cited

U.S. PATENT DOCUMENTS

2011/0001333 A1\* 1/2011 Bruestle ................ B60J 7/1614
                                                    296/100.05
2016/0243975 A1\* 8/2016 Singer ...................... B60P 7/04
2018/0118005 A1\* 5/2018 Molinar Olivas ..... B60J 7/1614

\* cited by examiner

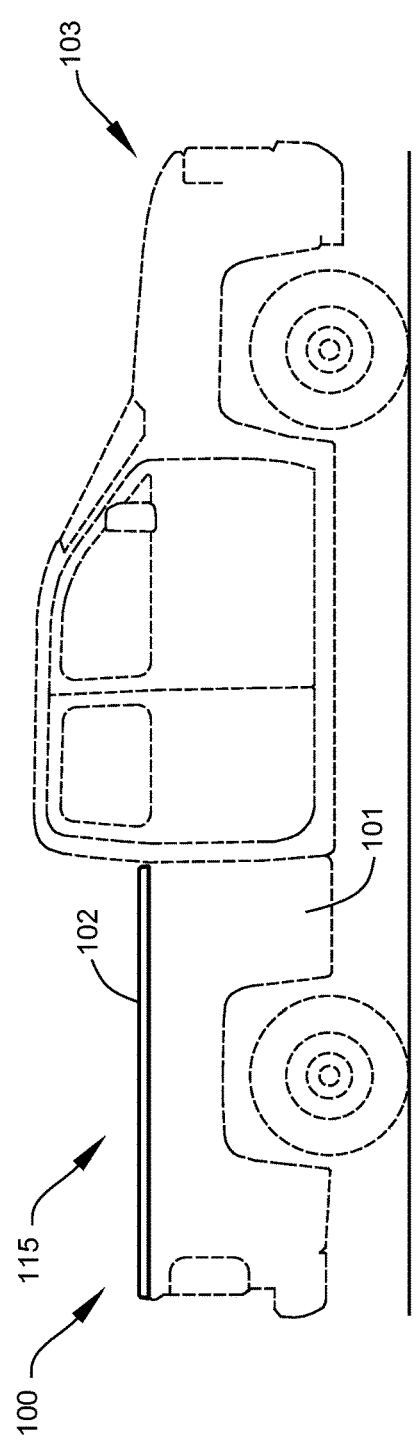
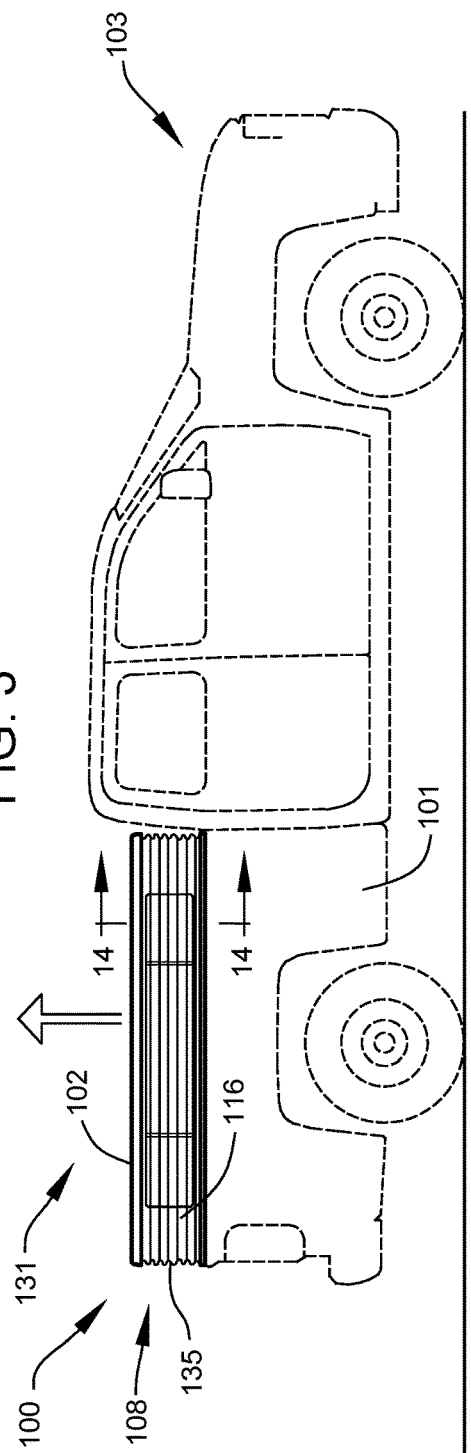

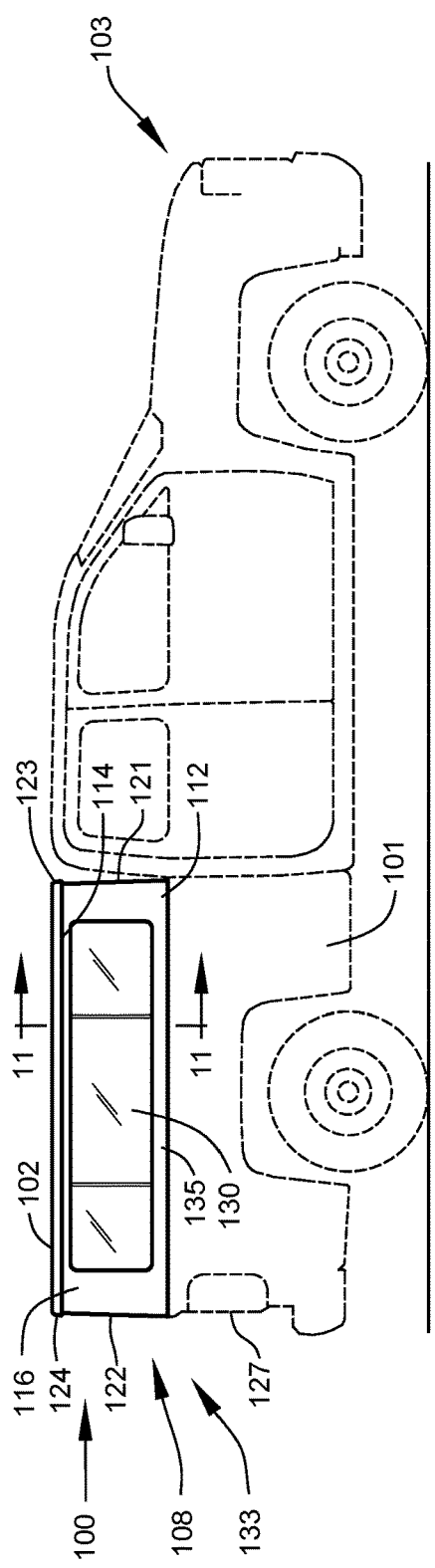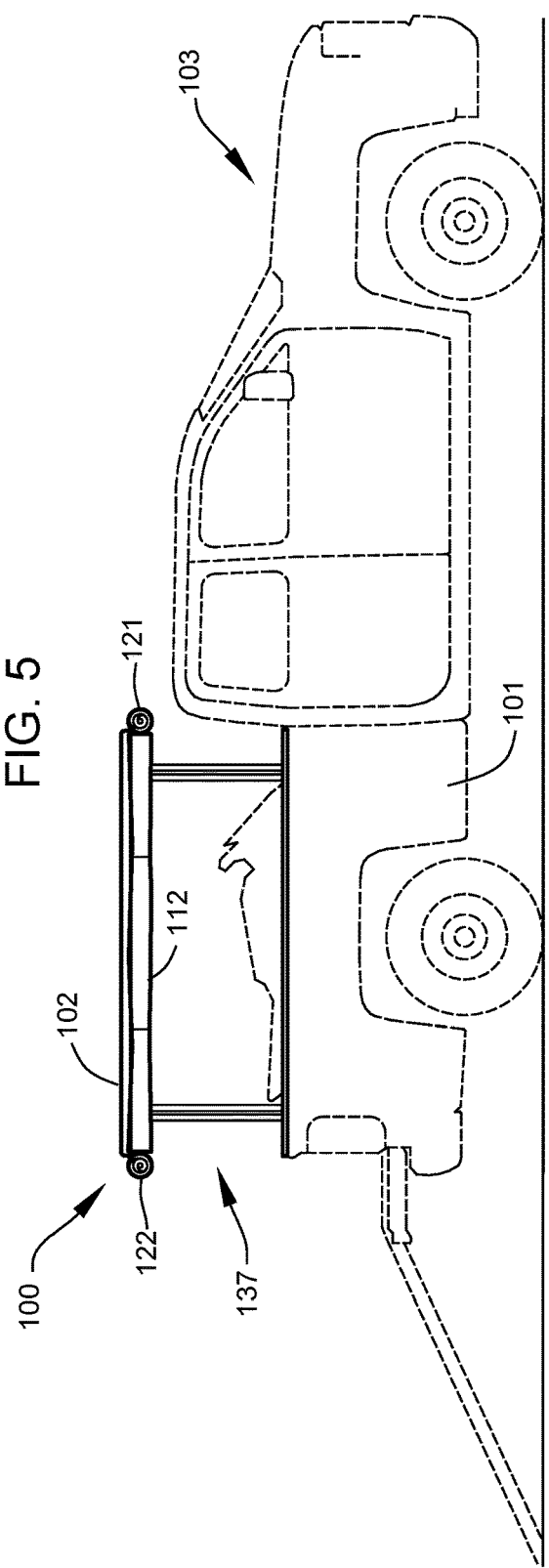

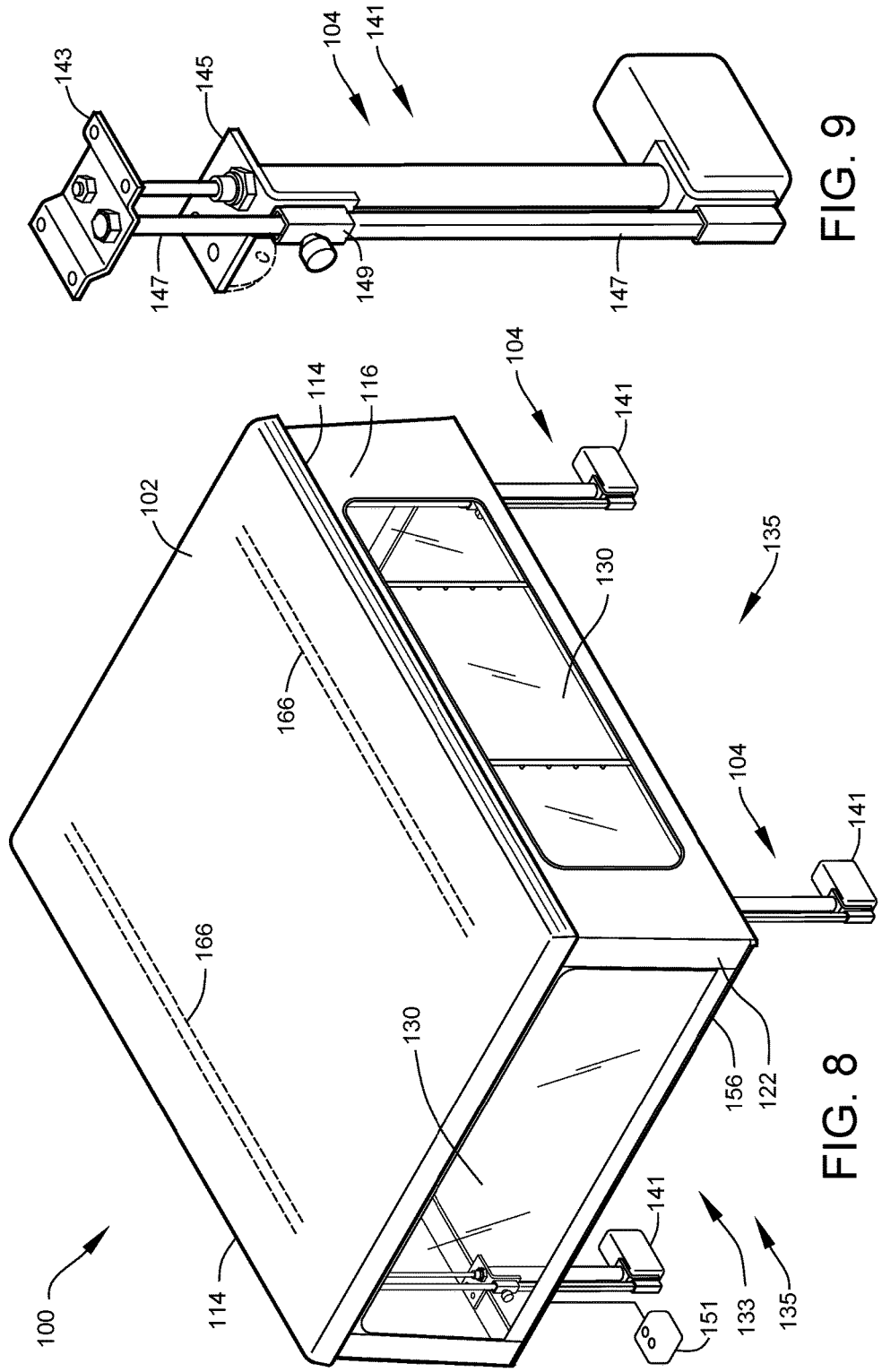

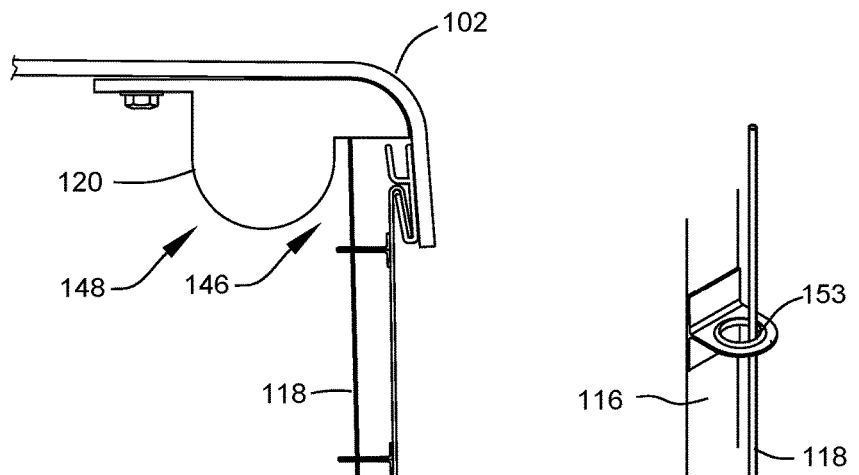
FIG. 12
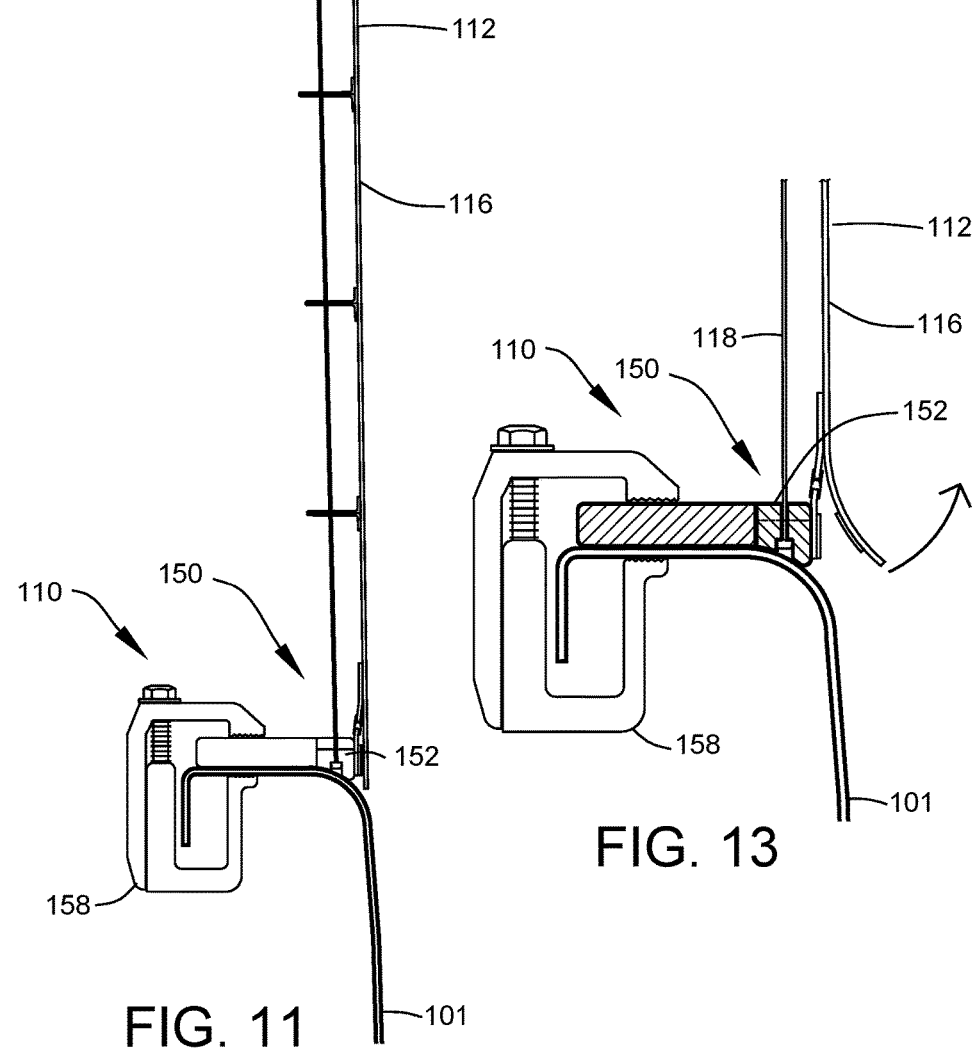
FIG. 11
FIG. 13

CARGO-BED COVER SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Technical Field

The present invention relates generally to the field of bodies and tops for land vehicles of existing art and more specifically relates to land-vehicle tops, capable of a vertical lifting movement, having enclosing panels solely supported by a camper-body roof.

Related Art

Tonneau covers, bed toppers, and similar enclosures are useful to provide security and weather protection for items being transported in the cargo bed of a pickup truck. Unfortunately, tonneau covers limit the size of items that can be transported and toppers are heavy and difficult to install and remove from the pickup truck bed when not required. A selectively extendable tonneau structure that may be easily opened to form an enclosed topper (camper) and readily collapsed when not in use to cover the pickup truck bed at a level below the rear window of the truck cab would benefit many.

Prior attempts have been made to address the above-noted problems; for example, U.S. Pat. No. 6,209,944 to Billiu et al. relates to a stowable truck bed enclosure. The described stowable truck bed enclosure includes a stowable top or cover mounted on an open bed of a truck, such as a pickup truck, using lift frames and actuators in a manner to be raised above the bed. The cover and lift frames include attachment channels for connecting a flexible tent-like enclosure thereto such that the enclosure can be attached thereto after the cover is raised. The flexible enclosure can comprise a camper enclosure that encloses the truck bed and also optionally can extend beyond the truck bed to form additional sitting and sleeping rooms supported on separate portable tent-type posts and platforms. A flexible awning enclosure can be attached to the raised cover and lift frames to form an awning that extends beyond the truck bed supported on separate tent-type posts to provide a covered area for on-site work/commercial/recreational activities. An office enclosure can be attached to the raised cover and lift frames to form an office or meeting room where job-site work/meetings and the like can be conducted protected from the weather. The apparatus of Billiu et al. has several disadvantages in that the flexible enclosure of must be installed after raising the cover and must be removed before operation of the vehicle.

SUMMARY OF THE INVENTION

In view of the foregoing disadvantages inherent in the known art relating to land-vehicle tops, capable of a vertical lifting movement, having enclosing panels solely supported by a camper-body roof, the present disclosure provides a novel cargo-bed cover system and method. The general purpose of the present disclosure, which will be described herein, is to provide an apparatus having the functionality of both a truck topper and a hard-top tonneau cover.

A cargo-bed cover system is disclosed herein. The cargo-bed cover system may include a rigid cover configured to cover the cargo bed of the pickup truck; coupled to the rigid cover, a mechanically-powered lifting assembly configured to vertically lift the rigid cover between a bed-covering position, located adjacent the cargo bed, and at least one raised position located above the cargo bed; a mounting assembly configured to removably mount the mechanically-powered lifting assembly to the cargo bed; a pair of enclosing side panels configured to enclose an area formed between a side portion of the rigid cover and the cargo bed when the rigid cover is in the at least one raised position, each of such enclosing side panel(s) being constructed from at least one flexible sheet material; a set of stabilizing support cables configured to stably support the flexible sheet material of the enclosing side panels during operation of the pickup truck; at least one cable tensioner adapted to maintain the stabilizing support cables in a state of tension as the rigid cover is lifted vertically between the bed-covering position and the at least one raised position; an enclosing-front-panel configured to enclose a space formed between a front portion of the rigid cover and the cargo bed when the rigid cover is in the at least one raised position; and an enclosing-rear-panel configured to enclose a space formed between a rear portion of the rigid cover and a tailgate of the cargo bed when the rigid cover is in the at least one raised position. In addition, the enclosing-rear-panel may be constructed from the at least one flexible sheet material. The rigid cover may be constructed from at least one fiber-reinforced plastic composite.

Moreover, the enclosing-front-panel may include at least one transparent front window and the enclosing-rear-panel may include at least one transparent rear window, wherein the at least one transparent rear window may include a releasable window fastener configured to releasably fasten the at least one transparent rear window within the enclosing-rear-panel. The at least one transparent rear window may be removable from the enclosing-rear-panel. Each of such enclosing side panel(s) may also include at least one transparent window.

The mounting assembly may include a front frame section including a front-frame attacher configured to removably attach the front frame section to a top surface of a front wall of the cargo bed. The mounting assembly may further include a first sidewall-frame section including a first-sidewall-frame attacher configured to removably attach the first sidewall frame to a top surface of a first sidewall of the cargo bed and a second sidewall-frame section including a second-sidewall-frame attacher configured to removably attach the second sidewall frame to a top surface of a second sidewall of the cargo bed.

Each of the enclosing side panels may comprise a set of cable receivers configured to receive stabilizing support cables. The set of cable receivers are further adapted to couple the two stabilizing support cables to a respective one of the enclosing side panels. Each of such enclosing side panels may be supported by two or more stabilizing support cables.

Each one of the stabilizing support cables comprise a first cable end and a second cable end. The first cable end may include a first-end coupler adapted to releasably couple the first cable end to the rigid cover. The second cable end may include a second-end coupler adapted to releasably couple the second cable end to the mounting assembly.

The mechanically-powered lifting assembly may be electrically actuated. The mechanically-powered lifting assembly may comprise an electrical connector adapted to connect the mechanically-powered lifting assembly to an electrical power source of the pickup truck and at least one user-operable control unit configured to enable user control of the operation of the mechanically-powered lifting assembly.

The enclosing-rear-panel may comprise a rigid transverse bar configured to rigidly support a lower edge portion of the enclosing-rear-panel in a position adjacent the tailgate. The rigid transverse bar may include a set of bar-end couplers adapted to releasably couple the rigid transverse bar to the mounting assembly. The mounting assembly may comprise a set of clamps adapted to releasably clamp the mounting assembly to the cargo bed.

Moreover, it provides such a cargo-bed cover system, further comprising set of instructions; and wherein the cargo-bed cover system may be arranged as a kit.

In accordance with another preferred embodiment hereof, this invention provides a cargo-bed cover method, the method comprising the steps of: providing a rigid cover configured to cover the cargo bed of the pickup truck; providing a mechanically-powered lifting assembly configured to vertically lift the rigid cover between a bed-covering position located adjacent the cargo bed and at least one raised position located above the cargo bed; operably coupling the mechanically-powered lifting assembly to the rigid cover; providing a mounting assembly configured to removably mount the mechanically-powered lifting assembly to the cargo bed; providing a pair of enclosing side panels configured to enclose an area formed between a side portion of the rigid cover and the cargo bed when the rigid cover is in the at least one raised position, each of such enclosing side panels being constructed from at least one flexible sheet material; providing a set of stabilizing support cables configured to stably support the flexible sheet material of the enclosing side panels during operation of the pickup truck; and integrating the stabilizing support cables within the flexible sheet material of the enclosing side panels. Additionally, it provides such a method further comprising the steps of providing at least one cable tensioner adapted to maintain the stabilizing support cables in a state of tension as the rigid cover is lifted vertically between the bed-covering position and the at least one raised position.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a cargo-bed cover system and method, constructed and operative according to the teachings of the present disclosure.

FIG. 3 is a side view of the cargo-bed cover system of FIG. 1, showing the system configured as a tonneau-like cover, according to an embodiment of the present disclosure.

FIG. 4 is a side view of the cargo-bed cover system of FIG. 1, illustrating the system in a transitional (semi-raised) configuration, according to an embodiment of the present disclosure.

FIG. 5 is a side view of the cargo-bed cover system of FIG. 1, illustrating the system in a truck topper configuration, according to an embodiment of the present disclosure.

FIG. 6 is a side view of the cargo-bed cover system of FIG. 1, illustrating the system in a loading configuration, according to an embodiment of the present disclosure.

FIG. 8 is a perspective view of the cargo-bed cover system of FIG. 1, according to an embodiment of the present disclosure.

FIG. 9 is a perspective view of a mechanically-powered lifting assembly of the cargo-bed cover system of FIG. 1, according to an embodiment of the present disclosure.

FIG. 11 is a sectional view of the cargo-bed cover system of FIG. 1, through the section 11-11 of FIG. 5, according to an embodiment of the present disclosure.

FIG. 12 is a partial perspective view of a cable grommet of the cargo-bed cover system of FIG. 1, according to an embodiment of the present disclosure.

FIG. 13 is a detail view, enlarged for clarity of description, of a mounting assembly of the cargo-bed cover system of FIG. 1, according to an embodiment of the present disclosure.

The various embodiments of the present invention will hereinafter be described in conjunction with the appended drawings, wherein like designations denote like elements.

DETAILED DESCRIPTION

Figure 1:
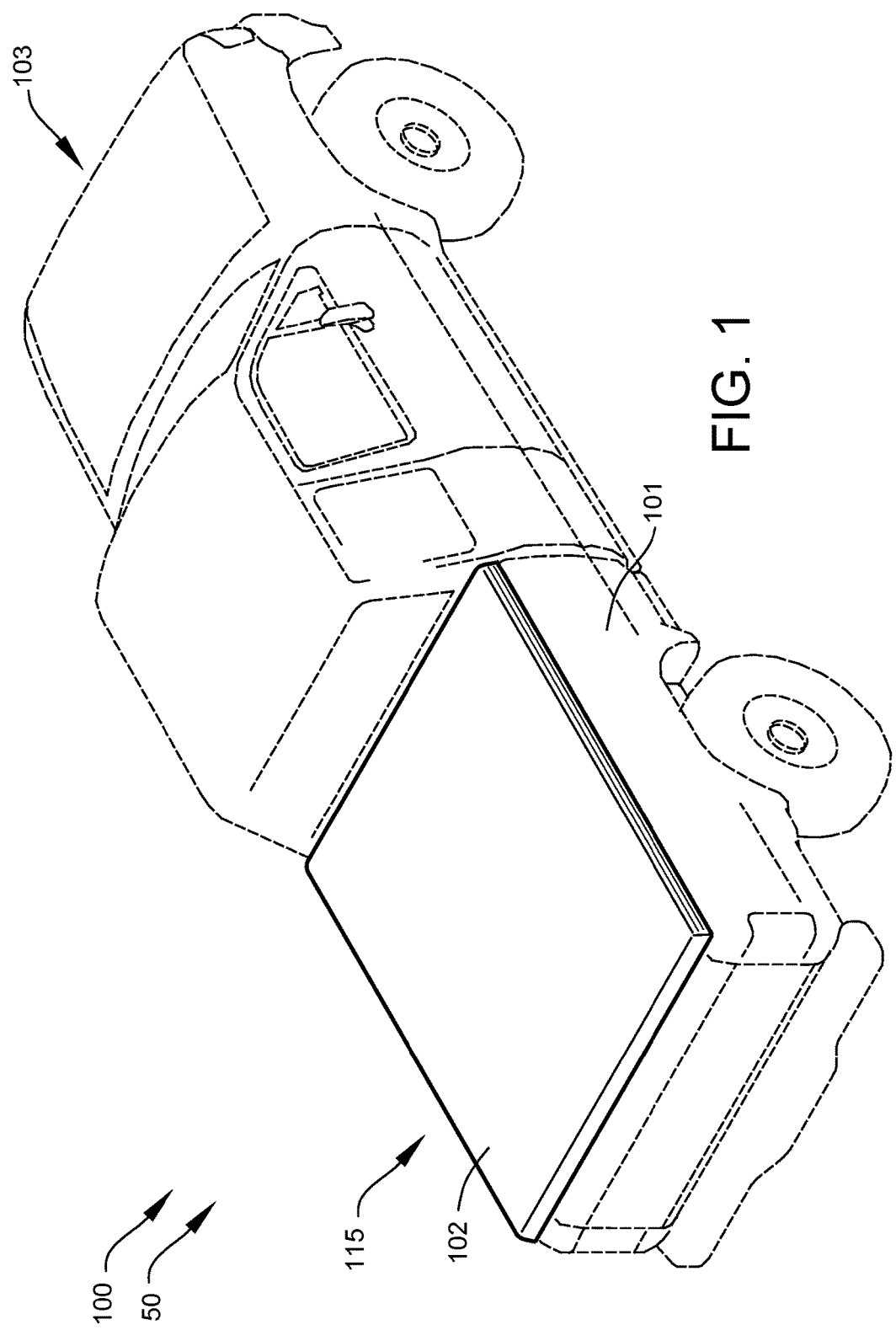
FIG. 1 is a perspective view of the cargo-bed cover system during an 'in-use' condition, according to an embodiment of the disclosure.

As discussed above, embodiments of the present disclosure relate to land vehicle tops having flexible enclosing panels solely supported by camper body roof and more particularly to a cargo-bed cover system and method as used to improve the covering of cargo beds of pickup trucks utilizing an apparatus having the functionality of both a truck topper and a hard-top tonneau cover.

Generally, the system is a truck box tonneau cover (hard cover top) that can lift via electric, spring, or hydraulic lifters until the tonneau cover reaches the level of the truck cab. The hard top tonneau cover may be chosen from a variety of options. For example, the hard top tonneau cover may be fold-up, roll up, a one-piece fiberglass, a metal, or the like. The device includes a set of enclosing panels composed of canvas or other flexible material used to enclose the sides and rear of the bed when tonneau is raised to the elevation flush with the truck cab roof line or above the roof line for loading and unloading of objects, if required. In the raised configuration, the enclosing panels completely enclose the cargo bed and effectively coverts the tonneau cover into a truck topper. When raised above the roof line, the canvas panels may be detached, allowing the rigid tonneau cover to be raised to fit oversized objects, then lower back down to flush with the roof of the truck cab for driving conditions.

The enclosing panels may include windows, as will be described in greater detail below. Portions or the entire enclosing panels may be detached from the assembly, which allows for cargo to be loaded over the side of the truck and into the truck bed, if necessary, while the hard-cover top is in the fully raised position, or above the roof line for loading & unloading of objects if required.

The enclosing panels may be constructed from canvas or a similar flexible and water-resistant material. The system can be locked and unlocked to secure contents at a top or bottom position. The unit sits on the bed rails of the pickup truck and can be removed as a single unit for storage.

A four-corner lift mechanisms (hydraulic, electric, spring assisted, etc.) is provided to raise and lower the tonneau cover hard lid. The cargo-bed cover system can be locked and unlocked to secure contents at top or bottom positions. The cargo-bed cover system mounts to and is supported by the bed rails of the pickup truck bed.

A flexible back panel/window is provided to enclose the rear of the bed when the hard tonneau cover is in the raised position. The back panel is configured to roll up and down and may include a rigid transverse bar extending along the base of the flexible back panel. In one version of the apparatus, the three flexible panels used to enclose the truck bed contents are constructed from a heavy duty canvas, or similar material. The flexible panels may be supplied with or without the above-noted vinyl windows.

The design includes an arrangement of panel-supporting cables, allowing the apparatus to be durable enough to be deployed at highway speeds factoring in the wind loading, snow, rain, etc. The cables supporting the flexible vinyl/canvas sides are held under constant tension to provide a tight line along which the canvas/vinyl panels may expand and contract. The flexible vinyl/canvas panels are configured to fold in a manner similar to the way that window blinds fold, stack, and expand. The flexible panels include grommets that are installed within the fabric/canvas/vinyl. The cables slide within the grommets, thus ensuring the flexible material is not subjected to excessive wear and abrasion. This arrangement allows for the canvas to be snug fitting to prevent undesirable wind-induced aerodynamic oscillations in the fabric panels during driving conditions.

The design utilizes a set of three mounting rails on which the tonneau cover rests when lowered. The mounting rails are clamped, or otherwise secured, to the bed rails of the truck box in a manner allowing the cover assembly to be quickly lifted off as one piece (tonneau lid, bed rails, canvas sides, and lifting mechanism joined as one fixed-together unit). One advantage of the single-unit arrangement is that a user is able to store the entire apparatus neatly against a wall of a garage, or the apparatus may be hoisted into the ceiling of a garage to get it out of the way, or to use the truck bed without the topper setup on the truck, for normal truck utility purposes. The cables supporting the flexible enclosing panels are maintained in constant tension, to limit undesirable wind-induced aerodynamic oscillations in the fabric panels during driving conditions.

Referring now more specifically to the drawings by numerals of reference, there is shown in FIGS. 1-14, various views of a cargo-bed cover system 100.

Figure 2:
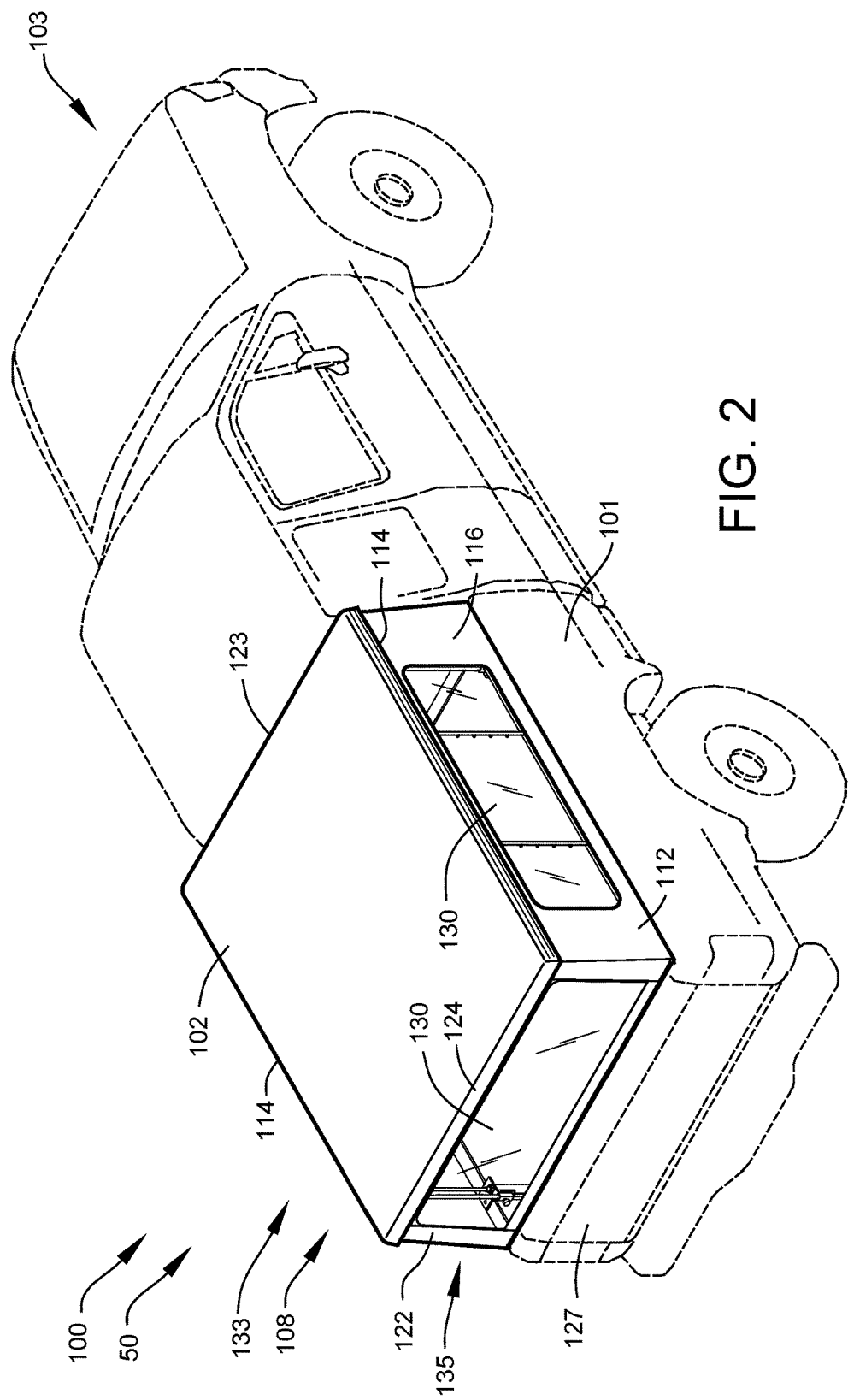
FIG. 2 is a perspective view of the cargo-bed cover system of FIG. 1, according to an embodiment of the present disclosure.

FIG. 1 and FIG. 2 show a cargo-bed cover system 100 during 'in-use' conditions 50, according to an embodiment of the present disclosure. Here, the cargo-bed cover system 100 may be beneficial for use by a user to enclose the cargo bed 101 of a pickup truck 103. A principal feature of the cargo-bed cover system 100 is the ability of the system to transform from a tonneau-like cover, shown in FIG. 1, to a truck topper, as shown in FIG. 2.

FIG. 3 is a side view of the cargo-bed cover system 100 of FIG. 1, showing the system in a tonneau-like cover configuration 115, according to an embodiment of the present disclosure. In this configuration, a low-profile rigid cover 102 is provided to cover the cargo bed 101 of the pickup truck 103. The cargo-bed cover system 100 is configured to allow the rigid cover 102 to be raised from the tonneau-like cover configuration 115, located adjacent to and covering the cargo bed 101, to at least one raised position 108 located above the cargo bed 101, as shown in FIG. 4 and FIG. 5.

FIG. 4 is a side view of the cargo-bed cover system 100, illustrating the system in a transitional (semi-raised) configuration 131. FIG. 5 is a side view of the cargo-bed cover system 100, illustrating the system in a truck topper configuration 133, according to an embodiment of the present disclosure. The rigid cover 102 of the cargo-bed cover system 100 is designed to move from the position depicted in FIG. 1 and FIG. 3, to a raised position 108 generally matching the elevation of the roof line of the cab of the pickup truck 103, as shown in FIG. 2 and FIG. 5. Alternately, the rigid cover 102 may be raised above the roof line for loading & unloading of objects if required The cargo-bed cover system 100 includes a set of enclosing panels 135 used to enclose the sides, front, and rear of the cargo bed 101. The enclosing panels 135 allow the system to be transformed into a truck topper, when the rigid cover 102 is in the raised position 108, as shown.

The enclosing panels 135 may include a pair of enclosing side panels 112 configured to enclose an area formed between a side portion 114 of the rigid cover 102 and the cargo bed 101 when the rigid cover 102 is in the raised position 108. The enclosing panels 135 may also include an enclosing-front-panel 121, as shown. If provided, the enclosing-front-panel 121 is configured to enclose a space formed between a front portion 123 of the rigid cover 102 and the cargo bed 101 when the rigid cover 102 is in the raised position 108. In addition, the enclosing panels 135 may include an enclosing-rear-panel 122 configured to enclose a space formed between a rear portion 124 of the rigid cover 102 and a tailgate 127 of the cargo bed 101 when the rigid cover 102 is in the raised position 108.

The rigid cover 102 may be constructed from one or more fiber-reinforced plastic composites. Alternately, the rigid cover 102 may be constructed from one or more aluminum alloys/metals and/or similar lightweight but rigid materials. The enclosing side panels 112 may be constructed from one or more flexible sheet materials 116. The flexible sheet material 116 may consists of a canvas or similar woven fabric with a UV stabilized polymer coating for water resistance. Such canvas material may be of a type commonly used to construct automotive convertible tops using a PVC (Polyvinyl chloride) coating. Such canvas material is resistant to wind, rain, sunlight, fading, mildew and rot. Both the enclosing-front-panel 121 and the enclosing-rear-panel 122 may be constructed from the same flexible sheet material 116. The each of the enclosing panels 135 are structured and arranged to provide a weather-tight seal between the respective enclosing panels 135 and the bed rails of the pickup truck 103. Thus, the enclosing side panels 112, the enclosing-front-panel 121, and the enclosing-rear-panel 122 are designed so that any water that falls on the cargo-bed cover system 100 will shed to the outside of the truck.

FIG. 6 is a side view of the cargo-bed cover system 100 of FIG. 1, illustrating the system in a loading configuration 137, according to an embodiment of the present disclosure. The rigid cover 102 may be raised above the cab of the pickup truck 103 to allow the loading of larger objects such as all terrain vehicles, snowmobiles, motorcycles, tall objects, etc. Prior to raising, the enclosing panels 135 may be detached from the lower rails and rolled upward to a position adjacent to the rigid cover 102, as shown. After the cargo is loaded, the rigid cover 102 may be lowered to a level substantially flush with the top of the truck cab top level, and again locked into place. The enclosing panels 135 may then be reattached to protectively-enclose the cargo bed 101.

Figure 7:
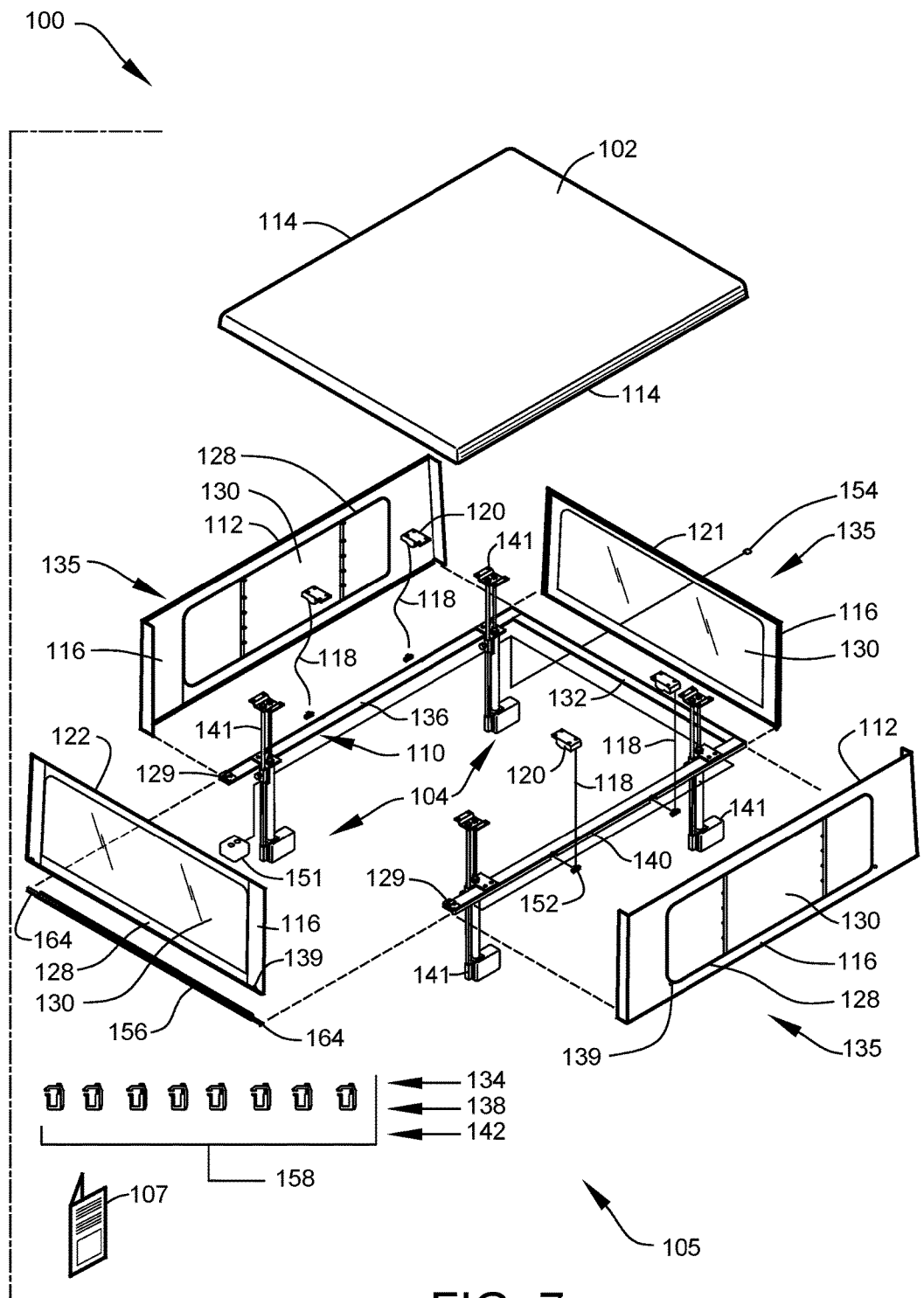
FIG. 7 is an exploded perspective view of the cargo-bed cover system of FIG. 1, according to an embodiment of the present disclosure.

FIG. 7 is an exploded perspective view of the cargo-bed cover system 100 of FIG. 1, according to an embodiment of the present disclosure. FIG. 8 is a perspective view of the cargo-bed cover system 100 of FIG. 1, according to an embodiment of the present disclosure. Each of the enclosing panels 135 may include at least one transparent window 130, as shown. More specifically, the enclosing side panels 112 may include at least one transparent window 130, the enclosing-front-panel 121 may include a transparent front window 130, and the enclosing-rear-panel 122 may include a transparent rear window 130, as shown. The transparent window panels may be removably secured to the flexible side panels using releasable window fasteners 128 The releasable window fastener 128 may be hook-and-loop fasteners (such as Velcro®), zippers, snaps, or similar releasable fasteners. Also, the window panels on both the right and left sides may include pad-lock hasps 139 to allow the windows, and the contents of the truck bed, to be secured. It is noted that the pad-lock hasps 139 may be adapted to lock the material between the rear panel and the side panel sections. This features allows the enclosing-rear-panel 122 to roll down and be secured with a rolling-bar locking mechanism (bar-end couplers 164) and also allows the pad lock hasps 139 to be locked while in the down position to secure rear and side panels together to prevent unauthorized access to the contents of the truck bed. It should be noted that any of the enclosing panels 135 may be supplied without window panels or may be supplied with more than one window in each panel. Thus, a customer purchasing a version of the system may customize the apparatus to match their preferences and needs with regard to panel transparency, concealment of cargo stored in the truck bed, etc.

The transparent rear window 130 may include a releasable window fastener 128 configured to releasably fasten the transparent rear window 130 within the enclosing-rear-panel 122, thus allowing the transparent rear window 130 to be removable from the enclosing-rear-panel 122, if required. The releasable window fastener 128 may further include pad-lock hasps to secure the transparent rear window 130 in place.

The cargo-bed cover system 100 utilizes a mounting assembly 110 composed of three frame sections, as shown. More specifically, the mounting assembly 110 may include a front frame section 132, a first sidewall-frame section 136, and a second sidewall-frame section 140, as shown. The front frame section 132 may include a front-frame attacher 134 configured to removably attach the front frame section 132 to a top surface of a front wall of the cargo bed 101. The first sidewall-frame section 136 may include a first-sidewall-frame attacher 138 configured to removably attach the first sidewall frame section 136 to a top surface of a first sidewall of the cargo bed 101. The second sidewall-frame section 140 may include a second-sidewall-frame attacher 142 configured to removably attach the second sidewall frame section 140 to a top surface of a second sidewall of the cargo bed 101. The front-frame attacher 134, the first-sidewall-frame attacher 138, and the second-sidewall-frame attacher 142 may each be a set of clamps 158 adapted to releasably clamp the mounting assembly 110 to the cargo bed 101. The clamps 158 may be C-shaped clamps with a nut and bolt to tighten and secure the three frame sections in place to the bed rails of the cargo bed 101 using only a wrench. The mounting assembly 110 allows the assembly to be quickly lifted off as one piece (the components of the system joined as one fixed-together unit). Alternately, other clamping and/or fastening devices may be utilized to secure the three frame sections in place to the bed rails of the cargo bed 101. For structural rigidity, the corners of the frame sections may be supplied with diagonal stabilizer bars to connect the sidewall-frame sections to the front frame section 132 (i.e., each corner including a brace arranged to form a triangle in the two front corners so that the three frame sections are stabilized when removed from the truck bed rails).

The enclosing-rear-panel 122 may comprise a rigid transverse bar 156 configured to rigidly support a lower edge portion of the enclosing-rear-panel 122 in a position adjacent to the tailgate 127. The rigid transverse bar 156 may include a set of bar-end couplers 164 adapted to releasably couple the rigid transverse bar 156 to the mounting assembly 110. The bar-end couplers 164 may include a locking mechanism configured to clicks/snap the ends of the rigid bar into a set of receivers 129, thus allowing the flexible back panel to be secured in place. The rigid bar may further function to create a weathertight seal with the top of the tailgate 127 (see also FIG. 1 and FIG. 2). In some versions of the present system, rigid cover 102 may be equipped with a set of accessory mounts 166 attached to the top surface (as generally indicated by the dashed-line depiction of FIG. 8). Such accessory mounts 166 allow for aftermarket rails, cargo storage containers, bike racks, kayaks, canoes, ski and snowboard racks, etc. to be installed to the top surface of rigid cover 102.

A mechanically-powered lifting assembly 104 is provided to vertically lift the rigid cover 102 between the bed-covering position 106, located adjacent the cargo bed 101, and the raised position 108 located above the cargo bed 101 (see FIG. 1 and FIG. 2). FIG. 9 is a perspective view of a single lifting actuator 141 of the mechanically-powered lifting assembly 104. The mechanically-powered lifting assembly 104 may utilize four lifting actuators 141 located at the corners of the cargo bed 101, as shown. Each of the lifting actuators 141 includes an upper mounting flange 143 adapted to couple the lifting actuator 141 to the underside of the rigid cover 102. Each of the lifting actuators 141 further includes a lower mounting bracket 145 adapted to couple the lifting actuator 141 to the sidewall-frame section of the mounting assembly 110, as shown FIG. 14. In some embodiments of the present system, the upper mounting flange 143 and lower mounting bracket 145 may include lockable pivots to allow the actuator to pivot to a flat position adjacent the rigid cover 102 for storage.

A telescopic guide bar 147 with a clamping/locking mechanism 149 is used to secure the cover at a user-selected height. The cargo-bed cover system 100 can be locked and unlocked to secure the assembly at the top or bottom positions or could be locked in any position in-between the bottom and top positions.

The lifting actuators 141 of the mechanically-powered lifting assembly 104 are electrically powered linear actuators. The mechanically-powered lifting assembly 104 may comprise an electrical connector 154 adapted to connect the mechanically-powered lifting assembly 104 to an electrical power source of the pickup truck 103. The electrical power source may be 12-volt electrical power from the battery of the pickup truck 103. At least one user-operable control unit 151 with a button control may be provided to enable user control of the operation of the mechanically-powered lifting assembly 104. Upon reading this specification, it should be appreciated that, under appropriate circumstances, considering such issues as user preferences, design preference, structural requirements, marketing preferences, cost, available materials, technological advances, etc., other actuator arrangements such as, for example, air-assisted units, hydraulic, pistons, screws, jacks/scissor lifts, manually-operated units, spring assisted units, gas-shock assisted units, etc., may be sufficient.

Figure 10:
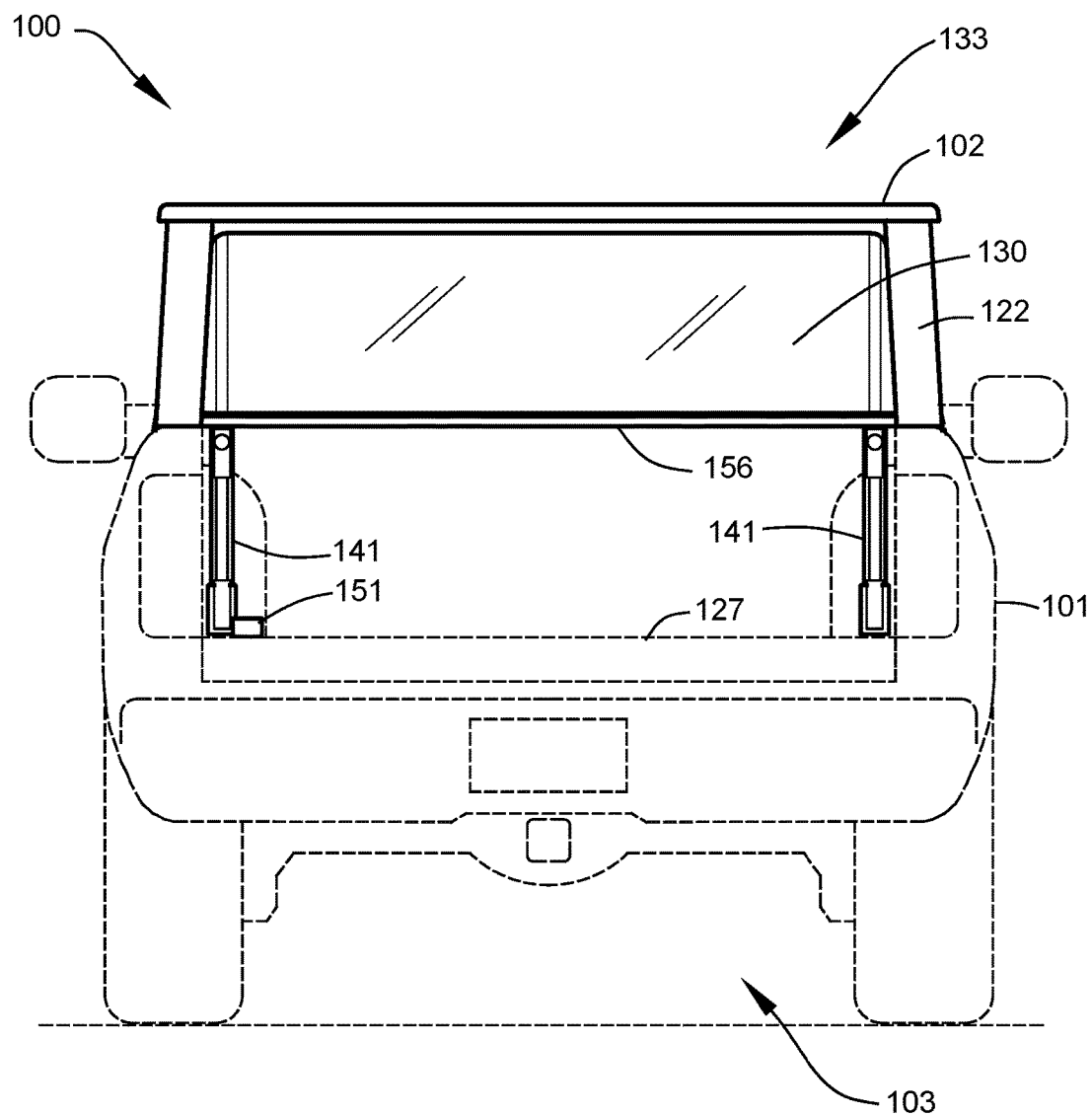
FIG. 10 is a rear view of the cargo-bed cover system of FIG. 1, illustrating the system in the truck topper configuration, according to an embodiment of the present disclosure.

FIG. 10 is a rear view of the cargo-bed cover system 100 of FIG. 1, illustrating the system in the truck topper configuration 133, according to an embodiment of the present disclosure. FIG. 10 shows that the control unit 151 may be mounted at any accessible location within the cargo bed 101.

FIG. 11 is a sectional view of the cargo-bed cover system 100 of FIG. 1, through the section 11-11 of FIG. 5, according to an embodiment of the present disclosure. FIG. 12 is a detail perspective view of a cable grommet 153 of the cargo-bed cover system 100 of FIG. 1, according to an embodiment of the present disclosure. FIG. 13 is a detail view, enlarged for clarity of description, of the mounting assembly 110 of the cargo-bed cover system 100 of FIG. 1, according to an embodiment of the present disclosure.

The enclosing side panels 112 may include a set of stabilizing support cables 118 configured to stably support the flexible sheet material 116 of the enclosing side panels 112 during operation of the pickup truck 103. Each of the enclosing side panels 112 may comprise a set of cable receivers (cable grommets 153) configured to receive and retain the stabilizing support cables 118, as generally shown in FIG. 12. The set of cable grommets 153 are further adapted to couple the stabilizing support cables 118 to a respective one of the enclosing side panels 112. Each of the enclosing side panels 112 may be supported by two or more stabilizing support cables 118, as shown. The cable grommets 153 forming the cable receivers supportively couple the flexible enclosing panels to the cables and reduce abrasion between the cables and the flexible sheet material 116.

Each one of the stabilizing support cables 118 comprise a first cable end 146 and a second cable end 150. The first cable end 146 may include a first-end coupler 148 adapted to releasably couple the first cable end 146 to the rigid cover 102. The second cable end 150 may include a second-end coupler 152 adapted to releasably couple the second cable end 150 to the mounting assembly 110. The first-end coupler 148 of each of the stabilizing support cables 118 may be supplied as a cable tensioner 120 adapted to maintain the stabilizing support cables 118 in a state of tension as the rigid cover 102 is lifted vertically between the bed-covering position 106 and the at least one raised position 108. The cable tensioners 120 are mounted to the underside of the rigid cover 102, as shown. The cable tensioners 120 may include a spring-tensioned reel on which the stabilizing support cables 118 is wound. The stabilizing support cables 118 supporting the flexible enclosing panels are maintained in constant tension, to limit undesirable wind-induced aerodynamic oscillations in the fabric panels during driving conditions.

When the system is configured to be convertible to a truck topper, the second-end coupler 152 of the stabilizing support cables 118 engage a socket located within the sidewall-frame sections of the mounting assembly 110. When the user wishes to detach an enclosing side panel 112 from the lower mounting assembly 110, the user lifts the lower portion of the enclosing side panels 112 to expose a zipper, set of snaps, hook-and-loop (Velcro®), or other releasable attachment component of the assembly. The user may work their way around detaching the perimeter of the enclosing side panel 112 until reaching a stabilizing support cable 118. The second-end coupler 152 of the stabilizing support cables 118 allows the user to detach the stabilizing support cables 118 from the mounting assembly 110, thereby allowing the base of the enclosing side panel 112 and stabilizing support cables 118 to be detached and rolled upward or completely removed from the top assembly.

Figure 14:
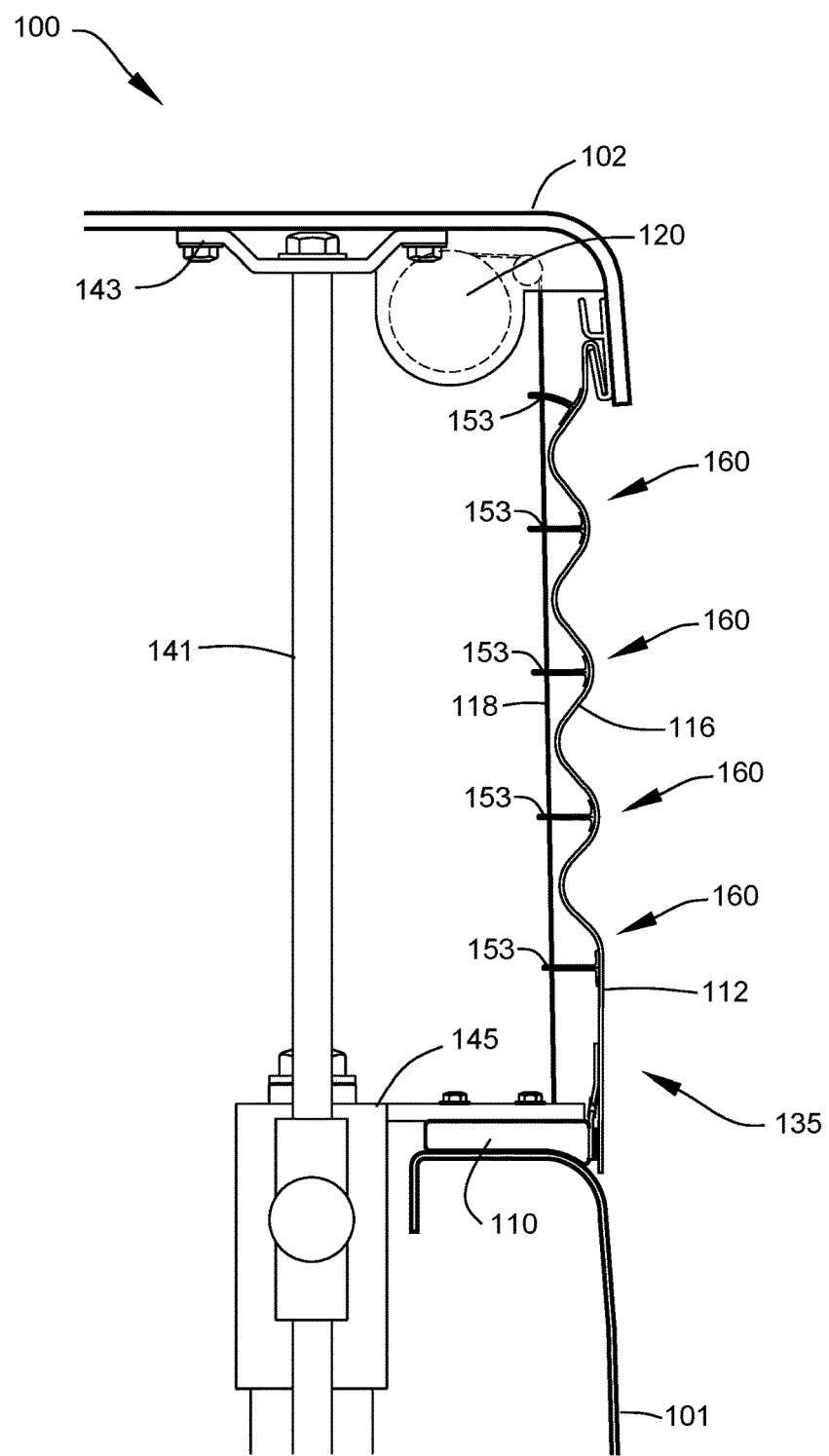
FIG. 14 is a sectional view of the cargo-bed cover system of FIG. 1, through the section 14-14 of FIG. 4, according to an embodiment of the present disclosure.

FIG. 14 is a sectional view of the cargo-bed cover system 100 of FIG. 1, through the section 14-14 of FIG. 4, according to an embodiment of the present disclosure. The stabilizing support cables 118 are held in constant tension during the raising and the lowering of the rigid cover 102. The tensioned stabilizing support cables 118 guide the enclosing panels during movement of the rigid cover 102 to maintain the panels in alignment with the bed rails, as shown. During raising and lowering operations, the flexible enclosing panels fold similar to the way that window blinds fold, stack, and expand. It is noted that the cable tensioners could also be attached to the bed rails or to the rigid cover 102, in other words, they could function from either alternate anchor point. In some versions of the system, a set of magnets 160 are incorporated within the enclosing panels 135 to ensure that the flexible sheet material 116 folds and unfolds along the creases of the fabric as intended. More specifically, the magnets 160 may be sewn into, or otherwise attached to, the flexible sheet material 116 and functions to assist in stacking the fabric/material correctly in place and also to help to secure and store it neatly as it is lowered toward the bed rail frame.

According to one embodiment, the cargo-bed cover system 100 may be arranged as a kit 105, as shown in FIG. 7. In particular, the cargo-bed cover system 100 may further include a set of instructions 107. The instructions 107 may detail functional relationships in relation to the structure of the cargo-bed cover system 100 such that the cargo-bed cover system 100 can be used, maintained, or the like, in a preferred manner.

Figure 15:
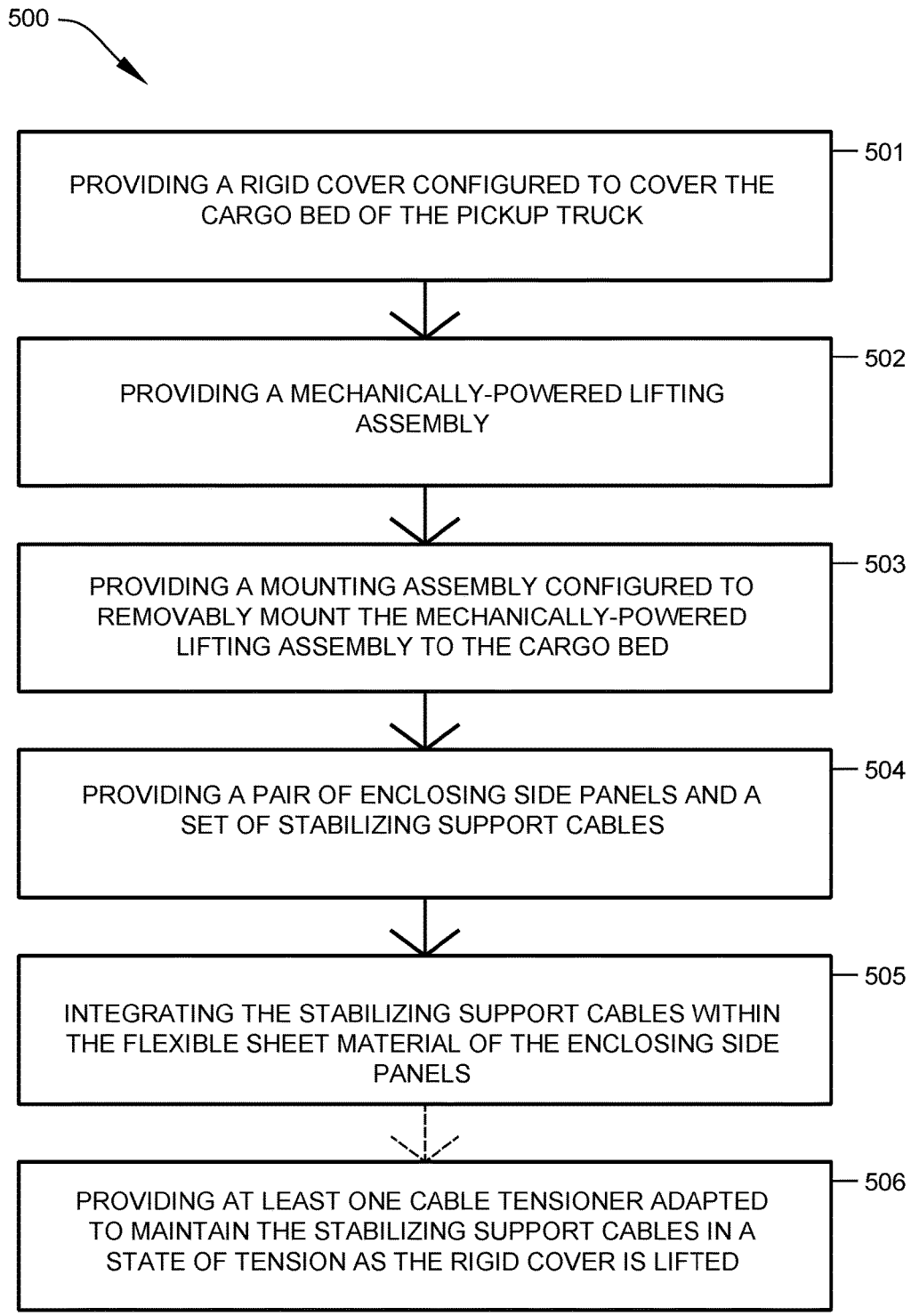
FIG. 15 is a flow diagram illustrating a method related to covering a cargo bed of a pickup truck, according to an embodiment of the present disclosure.

FIG. 15 is a flow diagram illustrating a method for enclosing the cargo bed of a pickup truck, according to an embodiment of the present disclosure. In particular, the method 500 may include one or more components or features of the cargo-bed cover system 100 as described above. As illustrated, the method 500 may include the steps of: step one 501, providing a rigid cover configured to cover the cargo bed of the pickup truck; step two 502, providing a mechanically-powered lifting assembly configured to vertically lift the rigid cover between a bed-covering position located adjacent the cargo bed and at least one raised position located above the cargo bed and operably coupling the mechanically-powered lifting assembly to the rigid cover; step three 503, providing a mounting assembly configured to removably mount the mechanically-powered lifting assembly to the cargo bed; step four 504, providing a pair of enclosing side panels configured to enclose an area formed between a side portion of the rigid cover and the cargo bed when the rigid cover is in the at least one raised position, each of such enclosing side panels being constructed from at least one flexible sheet material; providing a set of stabilizing support cables configured to stably support the flexible sheet material of the enclosing side panels during operation of the pickup truck; and step five 505, integrating the stabilizing support cables within the flexible sheet material of the enclosing side panels. Additionally, method 500 further comprises the step six 506, of providing at least one cable tensioner adapted to maintain the stabilizing support cables in a state of tension as the rigid cover is lifted vertically between the bed-covering position and the at least one raised position.

It should be noted that step 506 is an optional step and may not be implemented in all cases. Optional steps of method 500 are illustrated using dotted lines in FIG. 15 so as to distinguish it from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for enclosing the cargo bed of a pickup truck [NOTE: e.g., different step orders within above-mentioned list, elimination or addition of certain steps, including or excluding certain maintenance steps, etc.], are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cargo-bed cover system, related to covering a cargo bed of a pickup truck, the cargo-bed cover system comprising:
   a rigid cover configured to cover the cargo bed of the pickup truck;
   coupled to the rigid cover, a mechanically-powered lifting assembly configured to vertically lift the rigid cover between a bed-covering position located adjacent the cargo bed and at least one raised position located above the cargo bed;
   a mounting assembly configured to removably mount the mechanically-powered lifting assembly to the cargo bed;
   a pair of enclosing side panels configured to enclose an area formed between a side portion of the rigid cover and the cargo bed when the rigid cover is in the at least one raised position, each of said enclosing side panel(s) being constructed from at least one flexible sheet material;
   a set of stabilizing support cables configured to stably support the flexible sheet material of the enclosing side panels during operation of the pickup truck;
   an enclosing-front-panel configured to enclose a space formed between a front portion of the rigid cover and the cargo bed when the rigid cover is in the at least one raised position;
   an enclosing-rear-panel configured to enclose a space formed between a rear portion of the rigid cover and a tailgate of the cargo bed when the rigid cover is in the at least one raised position; and
   wherein the enclosing-front-panel includes at least one transparent front window, and the enclosing-rear-panel includes at least one transparent rear window; and
   wherein the at least one transparent rear window includes a releaseable window fastener configured to releasably fasten the at least one transparent rear window within the enclosing-rear-panel, and the at least one transparent rear window is removable from the enclosing-rear-panel.

2. The cargo-bed cover system of claim 1, wherein the enclosing-rear-panel is constructed from the at least one flexible sheet material.

3. The cargo-bed cover system of claim 1, wherein each of said enclosing side panel(s) includes at least one transparent window.

4. The cargo-bed cover system of claim 1, wherein the mounting assembly includes
   a front frame section including a front-frame attacher configured to removably attach the front frame section to a top surface of a front wall of the cargo bed,
   a first sidewall-frame section including a first-sidewall-frame attacher configured to removably attach the first sidewall frame section to a top surface of a first sidewall of the cargo bed, and
   a second sidewall-frame section including a second-sidewall-frame attacher configured to removably attach the second sidewall frame section to a top surface of a second sidewall of the cargo bed.

5. The cargo-bed cover system of claim 1, wherein each of said enclosing side panel(s) is supported by at least two stabilizing support cables.

6. The cargo-bed cover system of claim 5, wherein each of said enclosing side panel(s) comprises a set of cable receivers configured to receive the at least two stabilizing support cables, the set of cable receivers further adapted to couple the at least two stabilizing support cables to a respective one of said enclosing side panel(s).

7. The cargo-bed cover system of claim 1, further comprising at least one cable tensioner adapted to maintain the stabilizing support cables in a state of tension as the rigid cover is lifted vertically between the bed-covering position and the at least one raised position.

8. The cargo-bed cover system of claim 1, wherein
   each one of the stabilizing support cables comprise a first cable end and a second cable end,
   the first cable end includes a first-end coupler adapted to releasably couple the first cable end to the rigid cover; and
   the second cable end includes a second-end coupler adapted to releasably couple the second cable end to the mounting assembly.

9. The cargo-bed cover system of claim 1 wherein the mechanically-powered lifting assembly is electrically actuated.

10. The cargo-bed cover system of claim 9 wherein the mechanically-powered lifting assembly comprises an electrical connector adapted to connect the mechanically-powered lifting assembly to an electrical power source of the pickup truck.

11. The cargo-bed cover system of claim 1, further comprising at least one user-operable control unit configured to enable user control of the operation of the mechanically-powered lifting assembly.

12. The cargo-bed cover system of claim 1, wherein
the enclosing-rear-panel comprises a rigid transverse bar configured to rigidly support a lower edge portion of the enclosing-rear-panel in a position adjacent the tailgate; and
the rigid transverse bar comprises a set of bar-end couplers adapted to releasably couple the rigid transverse bar to the mounting assembly.

13. The cargo-bed cover system of claim 1, wherein the mounting assembly comprises a set of clamps adapted to releasably clamp the mounting assembly to the cargo bed.

14. The cargo-bed cover system of claim 1, wherein the rigid cover is constructed from at least one fiber-reinforced plastic composite.

15. A cargo-bed cover system, related to covering a cargo bed of a pickup truck, the cargo-bed cover system comprising:
a rigid cover configured to cover the cargo bed of the pickup truck;
coupled to the rigid cover, a mechanically-powered lifting assembly configured to vertically lift the rigid cover between a bed-covering position located adjacent the cargo bed and at least one raised position located above the cargo bed;
a mounting assembly configured to removably mount the mechanically-powered lifting assembly to the cargo bed;
a pair of enclosing side panels configured to enclose an area formed between a side portion of the rigid cover and the cargo bed when the rigid cover is in the at least one raised position, each of said enclosing side panel(s) being constructed from at least one flexible sheet material;
a set of stabilizing support cables configured to stably support the flexible sheet material of the enclosing side panels during operation of the pickup truck;
at least one cable tensioner adapted to maintain the stabilizing support cables in a state of tension as the rigid cover is lifted vertically between the bed-covering position and the at least one raised position;
an enclosing-front-panel configured to enclose a space formed between a front portion of the rigid cover and the cargo bed when the rigid cover is in the at least one raised position; and
an enclosing-rear-panel configured to enclose a space formed between a rear portion of the rigid cover and a tailgate of the cargo bed when the rigid cover is in the at least one raised position;
wherein the enclosing-rear-panel is constructed from the at least one flexible sheet material;
wherein the enclosing-front-panel includes at least one transparent front window and the enclosing-rear-panel includes at least one transparent rear window;
wherein
the at least one transparent rear window includes a releaseable window fastener configured to releasably fasten the at least one transparent rear window within the enclosing-rear-panel, and
the at least one transparent rear window is removable from the enclosing-rear-panel;
wherein each of said enclosing side panel(s) includes at least one transparent window;
wherein the mounting assembly includes
a front frame section including a front-frame attacher configured to removably attach the front frame section to a top surface of a front wall of the cargo bed,
a first sidewall-frame section including a first-sidewall-frame attacher configured to removably attach the first sidewall frame section to a top surface of a first sidewall of the cargo bed, and
a second sidewall-frame section including a second-sidewall-frame attacher configured to removably attach the second sidewall frame section to a top surface of a second sidewall of the cargo bed;
wherein each of said enclosing side panel(s) is supported by at least two stabilizing support cables;
wherein each of said enclosing side panel(s) comprises a set of cable receivers configured to receive the at least two stabilizing support cables, the set of cable receivers further adapted to couple the at least two stabilizing support cables to a respective one of said enclosing side panel(s);
wherein
each one of the stabilizing support cables comprise a first cable end and a second cable end,
the first cable end includes a first-end coupler adapted to releasably couple the first cable end to the rigid cover, and
the second cable end includes a second-end coupler adapted to releasably couple the second cable end to the mounting assembly;
wherein the mechanically-powered lifting assembly is electrically actuated;
wherein the mechanically-powered lifting assembly comprises an electrical connector adapted to connect the mechanically-powered lifting assembly to an electrical power source of the pickup truck and at least one user-operable control unit configured to enable user control of the operation of the mechanically-powered lifting assembly;
wherein
the enclosing-rear-panel comprises a rigid transverse bar configured to rigidly support a lower edge portion of the enclosing-rear-panel in a position adjacent the tailgate, and
the rigid transverse bar comprises a set of bar-end couplers adapted to releasably couple the rigid transverse bar to the mounting assembly;
wherein the mounting assembly comprises a set of clamps adapted to releasably clamp the mounting assembly to the cargo bed;
wherein the rigid cover is constructed from at least one fiber-reinforced plastic composite;
wherein the at least one flexible sheet material includes a set of magnets configured to ensure that the at least one flexible sheet material folds and unfolds as intended; and
wherein the rigid cover comprised at least one accessory mount configured to assist mounting accessories to the rigid cover.

16. The cargo-bed cover system of claim 15, further comprising set of instructions; and
wherein the cargo-bed cover system is arranged as a kit.

17. A cargo-bed cover method, the method comprising the steps of:
providing a rigid cover configured to cover the cargo bed of the pickup truck;

providing a mechanically-powered lifting assembly configured to vertically lift the rigid cover between a bed-covering position located adjacent the cargo bed and at least one raised position located above the cargo bed;

operably coupling the mechanically-powered lifting assembly to the rigid cover;

providing a mounting assembly configured to removably mount the mechanically-powered lifting assembly to the cargo bed;

providing a pair of enclosing side panels configured to enclose an area formed between a side portion of the rigid cover and the cargo bed when the rigid cover is in the at least one raised position, each of such enclosing side panel(s) being constructed from at least one flexible sheet material;

providing a set of stabilizing support cables configured to stably support the flexible sheet material of the enclosing side panels during operation of the pickup truck;

integrating the stabilizing support cables within the flexible sheet material of the enclosing side panels; and providing at least one cable tensioner adapted to maintain the stabilizing support cables in a state of tension as the rigid cover is lifted vertically between the bed-covering position and the at least one raised position.

* * * * *